United States Patent [19]

Irwin

[11] Patent Number: 5,310,861
[45] Date of Patent: May 10, 1994

[54] DRAWABLE HIGH TENSILE STRENGTH ARAMIDS

[75] Inventor: Robert S. Irwin, Wilmington, Del.

[73] Assignee: E. I. Du Pont de Nemours and Company, Wilmington, Del.

[21] Appl. No.: 904,192

[22] Filed: Jun. 19, 1992

[51] Int. Cl.$^5$ .......................... C08G 69/26; C09K 3/00
[52] U.S. Cl. .............................. 528/339; 252/183.11; 528/344; 528/348
[58] Field of Search .................. 252/1, 182.15, 183.11; 264/DIG. 29; 528/318, 326, 328, 329.1, 335, 338, 339; 428/1

[56] References Cited

U.S. PATENT DOCUMENTS

| | | | |
|---|---|---|---|
| 3,063,966 | 11/1962 | Kwolek et al. | 528/339 X |
| 3,354,127 | 11/1967 | Hill, Jr. et al. | 528/339 X |
| 4,507,467 | 3/1985 | Shimada et al. | 528/348 |
| 4,962,181 | 10/1990 | Vora | 528/335 X |
| 4,987,215 | 1/1991 | Keil et al. | 528/329.1 |
| 4,987,216 | 1/1991 | Keil et al. | 528/329.1 |
| 5,177,175 | 1/1993 | Kiriyama et al. | 528/339 X |

*Primary Examiner*—Richard D. Lovering
*Attorney, Agent, or Firm*—Susan Borden Evans

[57] ABSTRACT

Aramids, which in the drawn state have high tensile strengths tensile elongations, and tensile moduli, are made from units derived from p-phenylenediamine, terephthalic acid, a substituted terephthalic acid, and 4,4'-bibenzoic acid or 2,6-naphthalene dicarboxylic acid. The aramids are useful for ropes and composites.

14 Claims, No Drawings

DRAWABLE HIGH TENSILE STRENGTH ARAMIDS

FIELD OF INVENTION

Aramid polymers whose fibers and films are drawable and after drawing possess a combination of very high tensile strength, tensile elongation and modulus, are provided.

TECHNICAL BACKGROUND

It is well known in the art that the essence of high fiber tensile strength and modulus is the capability of macromolecules, of adequately high molecular weight, to adopt a fully extended (rod-like) conformation and good parallelization (orientation) with respect to the fiber axis. With fairly stiff-chain para-aramids, exemplified by poly(p-phenyleneterephthalamide) (PPD-T), good orientation is accomplished by virtue of the ability of precursor liquid crystalline spinning solutions to become well oriented on extrusion through a spinneret and prior to coagulation. Fibers thus formed are not capable of significant draw-orientation, although modulus, and sometimes, to a lesser extent, tenacity may be improved by heat-treatment under tension, which is in effect a crystallization process. A second route to oriented aramid fibers of high strength and modulus is by choice of a semi-flexible composition such that, while it cannot form ordered, liquid crystalline solutions, an initially amorphous as-spun fiber may be very highly stretched at elevated temperature to bring the chains into good alignment. These are typically random copolymers which are non-crystalline in the drawn state. Random copolymers based on the corresponding di-acid, 3,4'-oxydibenzoic acid have been disclosed in a general way, e.g., as part of a large number of possibilities for combining certain cited monomers (Japanese Patent Application 78-143726), or as within the description of a generalized formula (H. Sasaki et al., U.S. Pat. No. 4,507,467). Such drawable copolymers generally do not have the capability for substantial crystallization, which is known, as cited earlier, to enhance orientation which is a major prerequisite for maximization of fiber strength.

Herein are disclosed random copolymers based on terephthalic acid, mono- or dichloroterephthalic acid, 4,4'-bibenzoic acid or 2,6-naphthalene dicarboxylic acid, and p-phenylenediamine (PPD), which upon drawing as spun fibers at high temperatures, or just heating as spun fibers under tension yields fibers with a combination of high tensile strength, high modulus, and relatively high elongation to break.

U.S. Pat. No. 4,698,414 discloses copolymers derived from terephthalic acid, 2,6-naphthalene dicarboxylic acid, and PPD. U.S. Pat. No. 5,003,036 discloses polymers containing units derived from chloroterephthalic acid, a second dicarboxylic acid such as terephthalic acid, and PPD. Neither of these patents mentions a polymer containing both chloroterephthalic acid and 2,6-naphthalene dicarboxylic acid. Fibers made in both patents cannot be drawn significantly in the dry state.

N. V. Luikasheva, et al., Vysokomol. Soedin., Ser. B, Vol. 20, p. 151–154 (1978) reports the synthesis of a polymer containing units derived from terephthalic acid, 4,4'-bibenzoic acid and PPD. It is believed that chloroterephthalic acid is not mentioned in this paper.

SUMMARY OF THE INVENTION

This invention concerns a drawable aramid, consisting essentially of repeat units of the formulas:

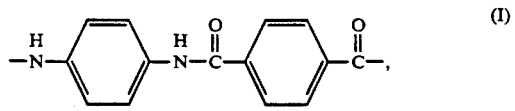

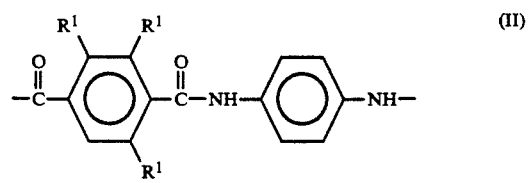

and

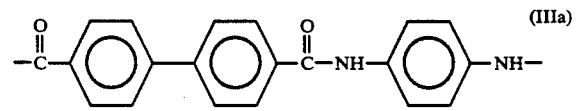

or

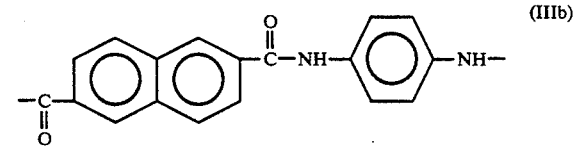

wherein each $R^1$ is independently hydrogen, chloro, bromo, or nitro, provided that one or two of $R^1$ are chloro, bromo or nitro, and at lesat one of $R^1$ is hydrogen; and further provided that the molar ratio of I to II plus IIIa or IIIb is about 70:30 to about 95:5, and the molar ratio of II to IIIa or IIIb is about 90:10 to about 10:90.

DETAILS OF THE INVENTION

In the instant aramids, it is preferred if one or two of $R^1$ is chloro to form chloroterephthalic acid or dichloroterephthalic acid. It is most preferred if one of $R^1$ is chloro to form chloroterephthalic acid.

It is also preferred that the molar ratio of I to II plus IIIa or IIIb is about 75:25 to about 90:10 It is also preferred that the molar ratio of II to IIIa or IIIb is about 4:1 to about 1:4, and more preferable if the ratio is about 2:1 to about 1:2.

Generally speaking, the aromatic diacids will be used in the form of their acyl halides, usually acyl chlorides.

The polymers may be made by techniques that are known for making prior art aramids, for example see British Patent 1,547,802 and U.S. Pat. No. 3,673,143. The polymers, as made, should be of sufficient molecular weight so that fiber or films may be formed. The polymers should have an inherent viscosity of about 2 or more. Such polymers may be spun into fibers or made into other shapes by methods known for prior art aramids, see for example U.S. Pat. No. 3,673,143, Example 2, for forming a film, and U.S. Pat. No. 3,767,756, for spinning a fiber.

The instant polymers, are drawable, and upon drawing exhibit greatly improved properties compared with undrawn polymer, particularly tensile modulus. In order for aramid polymers to be drawable, and upon drawing to exhibit optimal physical properties, it is believed, but Applicant does not wish to be bound by the hypothesis, that aramid polymers must have the following intrinsic properties: that they be soluble in a solvent for fiber spinning; that they be stable under the drawing conditions (especially high temperature); that they be largely amorphous in the as-spun (undrawn) state; and that they preferably exhibit higher crystallinity and higher orientation in the drawn state. Stretching of film strips provides an indication that a polymer will conform to these criteria. The polymers are soluble in sulfuric acid. While many aramids may meet some of these conditions, Applicant believes that only a small fraction of all aramid polymers theoretically possible would meet all these conditions.

The drawable polymers of this invention are useful in fibers and films where high tensile strength and tensile modulus are important, and for ropes and composites.

The preferred temperature for drawing is about 350° C. to about 575° C., most preferably about 400° C. to about 520° C. The temperature needed for any particular aramid can be readily determined by heating the aramid (say a film or fiber) to a given temperature and trying to draw by hand (see Example 1). If no draw is apparent higher temperatures should be tried.

The force needed to draw the fiber is determined by relatively easy experimentation. The aramid can be drawn to a specific draw value, provided that the aramid does not break at that amount of draw. Alternatively the aramid can be drawn by a certain force (but less than that required to break the aramid). This force can be readily determined for any aramid and temperature by heating the aramid to drawing temperature and applying just enough force to draw it while measuring the force with a tension gauge.

By the phrase "drawn at least X%" is meant the value computed by the following formula:

$$\frac{\text{(final length)} - \text{(original length)}}{\text{original length}} \times 100$$

It is preferred if the aramid is drawn at least 2%, more preferred if the aramid is drawn at least about 3%. It is also preferred if the tensile strength of the drawn aramid is at least 1.25 times the tensile strength of the undrawn aramid.

It is preferred if the orientation angle decreases upon drawing or tensioned heating. The orientation angle may be measured (in fibers) by the following method:

A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film, in a Warhus pinhole camera. Collimators in the camera are 0.64 mm in diameter. The exposure is continued for about fifteen to thirty minutes (or generally long enough so that the diffraction feature to be measured is recorded at an optical density of ~1.0).

A digitized image of the diffraction pattern is recorded with a video camera. Transmitted intensities are calibrated using black and white references, and gray level (0–255) is converted into optical density. The diffraction pattern of fibers of this invention has two prominent overlapping equatorial reflections at a scattering angle of approximately 20° and 22°; the inner (~20°) reflection is used for the measurement of Orientation Angle. A data array equivalent to an azimuthal trace through the two selected equatorial peaks (i.e., the inner reflection on each side of the pattern) is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak (with interpolation being used, that is not an integral number). Both peaks are measured and the Orientation Angle is taken as the average of the two measurements.

It is preferred if the apparent crystallite size of the drawn aramid is larger than in the undrawn aramid. The apparent crystallite size is measured by the following procedure:

Apparent Crystallite Size is derived from X-ray diffraction scans, obtained with an X-ray diffractometer (Philips Electronic Instruments; cat. no. PW1075/00) in reflection mode, using a diffracted-beam monochromator and a scintillation detector. Intensity data are measured with a rate meter and recorded by a computerized data collection and reduction system. Diffraction scans are obtained using the instrumental settings:

Scanning Speed: 1° $2\theta$ per minute
Stepping Increment: 0.025° $2\theta$
Scan Range: 15° to 30° $2\theta$
Pulse Height Analyzer: Differential Diffraction data are processed by a computer program that smooths the data, determines the baseline, and measures peak locations and heights.

The diffraction pattern of fibers from this invention is characterized by two prominent equatorial X-ray reflections. These peaks, occurring at approximately 20°–21° and 22° $2\theta$ (scattering angle), overlap substantially and may be difficult to resolve. Apparent Crystallite Size is calculated from the measurement of the half-height peak width of the first (lower scattering angle) equatorial diffraction peak. Because the two equatorial peaks overlap, the measurement of the half-height peak width is based on the half-width at half-height. For the 20°–21° peak, the position of the half-maximum peak height is calculated and the $2\theta$ value corresponding to this intensity is measured on the low angle side. The difference between this $2\theta$ value and the $2\theta$ value at maximum peak height is multiplied by two to give the half-height peak (or "line") width.

In this measurement, correction is made only for instrumental broadening; all other broadening effects are assumed to be a result of crystallite size. If B is the measured line width of the sample, the corrected line width $\beta$ is $$\beta = (B^2 - b^2)^{\frac{1}{2}}$$

where 'b' is the instrumental broadening constant. 'b' is determined by measuring the line width of the peak located at approximately 28.5° $2\theta$ in the diffraction pattern of a silicon crystal powder sample.

The Apparent Crystallite Size is given by
$ACS = (K\lambda)/(\beta \cdot \cos\theta)$, wherein K is taken as one (unity)
λ is the X-ray wavelength (here 1.5418 Å)
β is the corrected line breadth in radians
θ is half the Bragg angle (half of the 2θ value of the selected peak, as obtained from the diffraction pattern).

The drawing of aramids in the present invention occurs in the substantial absence of water or other solvents. By substantial absence of water or other solvent is meant less than about 5% water or other solvent, preferably less than about 2%. The molecular weight of the aramids should be high enough to be able to form a fiber.

Polymers should have an inherent viscosity of about 2 or more in sulfuric acid. A procedure for measuring inherent viscosity is given in U.S. Pat. No. 3,673,143, column 17, lines 10 et. seq., which is hereby included by reference.

The apparatus useful for drawing the aramids may be quite varied. It may even be done by hand, but for production more automated continuous processes are desirable. Apparatus useful for such processes are disclosed in U.S. Pat. Nos. 3,869,430 and 4,500,278, which are hereby included by reference.

In the following examples, fiber properties are measured by methods described in U.S. Pat. No. 3,869,429, column 10 line 28 to column 11, line 10, which is hereby included by reference.

EXAMPLE 1

In a dry resin kettle fitted with cage-type stirrer, thermometer, provision for adding solid, and provision for external cooling, was placed anhydrous N-methylpyrrolidone (284 ml) in which was dissolved 17.28 g PPD (0.160 mole) and 24.8 g anhydrous $CaCl_2$. The solution was cooled to 10° C. Then to this was added all at once a mixture of 24.36 g terephthaloyl chloride 0.120 mole), 5.70 g chloroterephthaloyl chloride (0.024 mole), and 4.048 g 2,6-naphthalenedicarbonyl chloride (0.016 mole). After stirring and allowing to warm to ambient temperature, the product was a soft gel. This was precipitated by excess water, filtered, washed with water, boiled in water 30 min., refiltered, rewashed, and dried at 90° C./15 hr. Inherent viscosity in 100% sulfuric acid was 2.84.

The polymer was dissolved in 100.1% $H_2SO_4$ at 20.0% solids. The resulting solution, at 60° C., was extruded through a Dynalloy X-5 filter and 10-hole spinnerets (0.003" diameter×0.006" length or 0.005" diameter×0.015" length) at 0.46 ml/min. (jet velocity 10.1 mpm for the smaller spinneret; 7.9 mpm for the larger), via a 1.0 cm air gap into a cocurrent stream of water at 2° C., and thence to a windup at various speeds up to 110 mpm. The washed fibers were allowed to dry in air on bobbins.

Fiber specimens were prepared under a variety of conditions as shown in Table 1. As-spun filament properties (average of 5 breaks) with highest tenacity levels given in parentheses are given in Table 2. Yarns were stretched by hand across a 1" semi-circular heated plate. Properties of drawn filaments are shown in Table 3.

TABLE 1

| Specimen No. | Spinneret (10 holes) (dia. × length in inches) | Through-put (ml/min.) | Jet Vel. (mpm) | Temperature (°C.) Cell | Transfer Line | Spinneret | Pressure (psi) | Coagul. Bath Temp. ($H_2O$) (°) | Spin Stretch Factor | Wind-up (mpm) |
|---|---|---|---|---|---|---|---|---|---|---|
| 1 | 0.003" × 0.006" | 0.46 | 10.06 | 59 | 62 | 41 | 160 | 2 | 6.9 | 70 |
| 2 | 0.003" × 0.006" | 0.46 | 10.06 | 59 | 60 | 41 | 150 | 2 | 9.0 | 91 |
| 3 | 0.003" × 0.006" | 0.46 | 10.06 | 59 | 58 | 40 | 130 | 2 | 10.9 | 110 |
| 4 | 0.003" × 0.006" | 0.46 | 10.06 | 59 | 57 | 40 | 140 | 2 | 8.1 | 81 |
| 5 | 0.005" × 0.015" | 0.99 | 7.86 | 59 | 57 | 43 | 130 | 2 | 12.5 | 98 |
| 6 | 0.005" × 0.015" | 0.99 | 7.86 | 59 | 57 | 43 | 120 | 2 | 8.1 | 63 |
| 7 | 0.005" × 0.015" | 0.99 | 7.86 | 59 | 57 | 43 | 120 | 2 | 10.1 | 80 |
| 8 | 0.005" × 0.015" | 0.99 | 7.86 | 59 | 57 | 43 | 120 | 2 | 14.0 | 110 |

TABLE 2

| | (Highest T in Parentheses) | | | |
|---|---|---|---|---|
| Specimen No. | T (gpd) | E (%) | Mi (gpd) | dpf |
| 1 | 13.9 (15.2) | 6.0 (6.7) | 374 (376) | 3.0 (3.1) |
| 1 | 14.9 (15.7) | 5.9 (5.9) | 390 (402) | 2.4 (2.2) |
| 3 | 15.1 (16.9) | 6.0 (6.2) | 293 (312) | 1.5 (1.3) |
| 4 | 16.1 (17.2) | 6.4 (6.2) | 383 (422) | 2.3 (2.0) |
| 5 | 14.7 (15.6) | 6.3 (6.4) | 385 (412) | 3.6 (3.3) |
| 6 | 14.0 (14.7) | 6.0 (6.2) | 386 (389) | 5.2 (5.0) |
| 7 | 16.0 (17.6) | 6.3 (6.3) | 422 (459) | 3.6 (2.6) |
| 8 | 15.2 (16.0) | 6.0 (6.0) | 398 (437) | 2.5 (2.7) |

TABLE 3

| | | (Highest T in Parentheses) | | |
|---|---|---|---|---|
| Specimen | Heat Treatment | T | E | Mi |
| 1 | 350° C./4% Draw | 14.8 (19.2) | 3.2 (3.9) | 537 (590) |
| | 375° C./2% Draw | 17.9 (19.5) | 3.8 (3.9) | 541 (584) |
| 2 | 300° C./ negligible draw | 18.3 (19.7) | 4.6 (4.4) | 478 (551) |
| | 350° C./ negligible draw | 18.4 (19.4) | 4.0 (4.9) | 528 (552) |

What is claimed is:

1. A drawable aramid random copolymer, consisting essentially of repeat units of the formulas

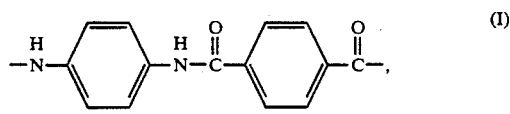

-continued

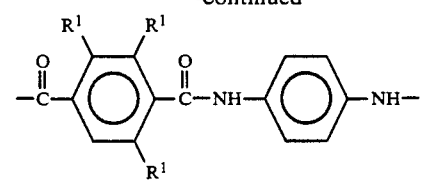
(II)

and

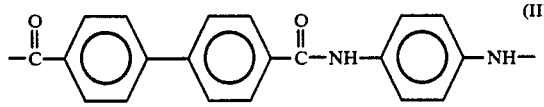
(IIIa)

or

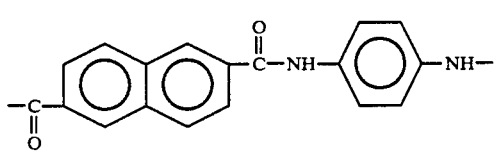
(IIIb)

wherein each $R^1$ is independently hydrogen, chloro, bromo, or nitro, provided that one or two of $R^1$ are chloro, bromo or nitro, and that at least one of $R^1$ is hydrogen; and further provided that the molar ratio of I to II plus IIIa or IIIb is about 75:25 to about 90:10, and the molar ratio of II to IIIa or IIIb is about 90:10 to about 10:90.

2. An aramid as recited in claim 1 wherein one or two of $R^1$ is chloro.

3. The aramid as recited in claim 2 wherein one of $R^1$ is chloro and two of $R^1$ are hydrogen.

4. The aramid as recited in claim 3 wherein the molar ratio of II to IIIa or IIIb is about 4:1 to about 1:4.

5. The aramid as recited in claim 1 wherein the molar ratio of II to IIIa or IIIb is about 4:1 to about 1:4.

6. The aramid as recited in claim 5 wherein the molar ratio of II to IIIa or IIIb is about 2:1 to about 1:2.

7. The aramid of claim 1 in the form of a fiber.

8. The aramid of claim 1 in the form of a drawn fiber.

9. The aramid of claim 3 in the form of a fiber.

10. The aramid of claim 3 in the form of a drawn fiber.

11. The aramid of claim 4 in the form of a fiber.

12. The aramid of claim 4 in the form of a drawn fiber.

13. The aramid of claim 5 in the form of a fiber.

14. The aramid of claim 5 in the form of a drawn fiber.

* * * * *